(12) United States Patent
Doyle et al.

(10) Patent No.: US 11,297,496 B2
(45) Date of Patent: Apr. 5, 2022

(54) ENCRYPTION AND DECRYPTION OF MANAGEMENT FRAMES

(71) Applicant: Hewlett Packard Enterprise Development LP, Houston, TX (US)

(72) Inventors: Aidan Doyle, Santa Clara, CA (US); Mohd Shahnawaz Siraj, San Jose, CA (US); Guangzhi Ran, Beijing (CN)

(73) Assignee: Hewlett Packard Enterprise Development LP, Houston, TX (US)

( * ) Notice: Subject to any disclaimer, the term of this patent is extended or adjusted under 35 U.S.C. 154(b) by 571 days.

(21) Appl. No.: 16/118,614

(22) Filed: Aug. 31, 2018

(65) Prior Publication Data

US 2020/0077258 A1    Mar. 5, 2020

(51) Int. Cl.
| | | |
|---|---|---|
| *H04W 12/04* | (2021.01) | |
| *H04L 29/06* | (2006.01) | |
| *H04L 9/08* | (2006.01) | |
| *H04W 88/08* | (2009.01) | |
| *H04W 84/12* | (2009.01) | |

(52) U.S. Cl.
CPC ........... *H04W 12/04* (2013.01); *H04L 9/0891* (2013.01); *H04L 9/0894* (2013.01); *H04L 63/0428* (2013.01); *H04L 63/062* (2013.01); *H04W 88/08* (2013.01); *H04L 2209/80* (2013.01); *H04W 84/12* (2013.01)

(58) Field of Classification Search
None
See application file for complete search history.

(56) References Cited

U.S. PATENT DOCUMENTS

| | | | |
|---|---|---|---|
| 7,519,184 B2 | 4/2009 | Kayashima et al. | |
| 7,805,603 B2 | 9/2010 | Qi et al. | |
| 8,595,481 B1* | 11/2013 | Gentry, Jr | H04W 12/37 |
| | | | 713/153 |
| 8,767,758 B2 | 7/2014 | Sood | |
| 9,197,415 B2 | 11/2015 | Kim et al. | |
| 10,341,908 B1* | 7/2019 | Bhartia | H04L 63/061 |
| 2005/0086465 A1 | 4/2005 | Sapkota et al. | |
| 2005/0207581 A1* | 9/2005 | Qi | H04W 12/037 |
| | | | 380/270 |
| 2008/0072047 A1 | 3/2008 | Sarikaya et al. | |
| 2008/0130538 A1 | 6/2008 | Raissinia et al. | |
| 2009/0019539 A1* | 1/2009 | Jonnalagadda | H04L 63/1458 |
| | | | 726/14 |

(Continued)

FOREIGN PATENT DOCUMENTS

CN    101646171 A    2/2010

OTHER PUBLICATIONS

Cisco Secure Services Client Administrator Guide, Release 5.1, (Web Page), Retrieved Jun. 6, 2018, 22 Pgs.

(Continued)

*Primary Examiner* — Arezoo Sherkat
(74) *Attorney, Agent, or Firm* — Brooks, Cameron & Huebsch, PLLC

(57) ABSTRACT

In some examples, a non-transitory computer-readable medium storing instructions executable by the processing resource to store an encryption key on the AP, at the AP, decrypt a management frame with the stored encryption key to determine state information of a station, store the state information, and generate a management frame at the AP based on the stored state information.

17 Claims, 5 Drawing Sheets

(56) References Cited

U.S. PATENT DOCUMENTS

| | | | |
|---|---|---|---|
| 2010/0115272 A1* | 5/2010 | Batta | H04W 12/033 |
| | | | 713/162 |
| 2011/0103232 A1 | 5/2011 | Sood | |
| 2014/0050167 A1 | 2/2014 | Smedman et al. | |
| 2015/0256453 A1 | 9/2015 | Laraqui et al. | |
| 2016/0029215 A1 | 1/2016 | Jung et al. | |
| 2016/0143069 A1 | 5/2016 | Xie et al. | |
| 2016/0183271 A1* | 6/2016 | Zhou | H04W 40/22 |
| | | | 370/315 |
| 2016/0337783 A1* | 11/2016 | Seok | H04L 63/0428 |
| 2019/0058996 A1* | 2/2019 | Frei | H04L 9/0897 |

OTHER PUBLICATIONS

Configuring Management Frame Protection, (Research Paper), Retrieved Jun. 6, 2018, 6 Pgs.

Patil, J., Get Your Wi-fi Network Ready for Windows 8, (Web Page), Oct. 12, 2012, 11 Pgs.

European Search Report and Search Opinion Received for EP Application No. 19164828.6, dated Oct. 9, 2019, 7 pages.

Extreme Networks, "Summit WM3000 Series Controller System Reference Guide", Software Version 4.3, Feb. 2011, 39 Pages.

Yang et al., "Architecture Taxonomy for Control and Provisioning of Wireless Access Points (CAPWAP)", RFC 4118, Jun. 2005, 41 Pages.

* cited by examiner

ENCRYPTION AND DECRYPTION OF MANAGEMENT FRAMES

BACKGROUND

Frames such as management frames can be used to manage and control wireless links. For example, management frames enable stations (STAs) to establish and maintain communications and support authentication, association, and synchronization.

DETAILED DESCRIPTION

Figure 1:
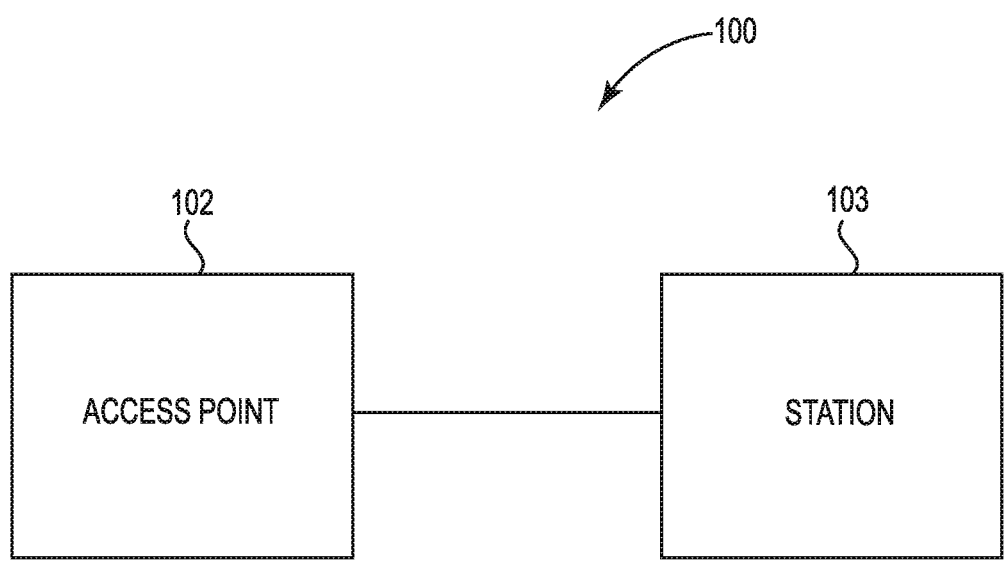
FIG. 1 is an example of a system for encryption and decryption of management frames including an access point (AP) and a station (STA) consistent with the present disclosure.

Wireless security protocols have been developed to protect wireless networks. Example wireless security protocols include wired-equivalent privacy (WEP), Wi-Fi Protected Access (WPA), WPA version 2 (WPA2), and WPA version 3 (WPA3), among others. The protocols can aid in preventing uninvited guests from connecting to a wireless network and can encrypt private data as it is being sent over airwaves.

For instance, example protocols can include the use of protected management frames (PMFs) such as deauthorization frames, disassociation frames, and specified action frames such as add block acknowledgement (ADDBA). The use of PMFs includes encrypting specified unicast management frames with the same pairwise transient key (PTK) used for data and using an Integrity Group Temporal Key (IGTK) to protect specified broadcast frames. In some example protocols, PMFs are used for opportunistic wireless encryption (OWE), personal modes of operation, and enterprise modes of operation. PMFs allow for protection of unicast and multicast management frames. For instance, unicast management action frames may be protected from both eavesdropping and forging, and multicast management action frames may be protected from forging.

Some management frames (e.g., ADDBA request management frames) are sent from an AP's wireless firmware component. These frames cannot be sent from an access controller (AC) because station (STA) state information used to generate these management frames is coupled with the AP's wireless firmware. To comply with PMF standards, these management frames are encrypted. However, in some AP architectures, tunnel forwarding mode is used, meaning encryption keys are not stored in the AP, and the AP cannot encrypt/decrypt these management frames.

Further, some approaches may partition Wireless Local Area Network (WLAN) protocol functions between an AC and an AP, but this does not address management frames generated and processed on the AP. Further still, an AC may have the security keys to decrypt the frames but may not parse contents of the management frames because the AC does not have state information about the STA. Moreover, a time of transit of a management frame between a STA and an AC with the security key to process the management frame may impart high latency in the processing of the management frame and/or be computationally intensive on the AC processing the management frame.

Accordingly, examples of the disclosure can allow for encryption and/or decryption of management frames in an architecture (e.g., "AP centralized crypto architecture) that stores encryption keys (e.g., PTK, IGTK, etc.) on an AP for encryption and decryption of management frames at the AP. For instance, an AP can store an encryption key and encrypt or decrypt a management frame with the stored encryption key, as detailed herein, in direct contrast to other "AC centralized encryption architectures" that store encryption keys and perform encryption/decryption on an access controller.

Notably in the AP centralized architectures described herein, while management frames can be encrypted and decrypted by the AP, data in data frames remain encrypted end-to-end from STA (e.g., a client device) to core (e.g., the AC) resulting in enhanced security as compared to other approaches. Put another way, examples of the present disclosure allow for encryption keys to stay at the AP (e.g., the encryption keys are not sent to the AC), with encryption and decryption of management frames happening at the AP. That is, keeping encryption keys on the AP can reduce latency in processing of management frames and distribute processing of the management among various network elements including APs. Yet decrypting and encrypting management frames at the AP provides enhanced security as data from data frames remains encrypted end-to-end from STA to the AC, and a link between the AP and the AC may be unsecured and/or without the overhead of various security protocols such as Internet Protocol Security (IPsec) that other approaches may rely on to secure the link between the AP and AC.

FIG. 1 is an example of a system 100 for encryption and decryption of management frames including an AP 102 and an STA 103 consistent with the present disclosure. APs, such as AP 102 may be used to provide devices access to a network. As used herein, an AP can refer to a networking device that allows a STA to connect to a wired or wireless network. As used herein, AP can, for example, refer to receiving points for any known or convenient wireless access technology which may later become known. Specifically, the term AP is not intended to be limited to IEEE 802.11-based APs. APs generally function as an electronic device that is adapted to allow wireless devices to connect to a wired network via various communication standards. An AP can include a processing resource, memory, and/or input/output interfaces, including wired network interfaces such as IEEE 802.3 Ethernet interfaces, as well as wireless network interfaces such as IEEE 802.11 Wi-Fi interfaces, although examples of the disclosure are not limited to such interfaces. An AP can include a memory resource, including read-write memory, and a hierarchy of persistent memory such as ROM, EPROM, and Flash memory. The network may be a wireless network, for example, a WLAN. As used herein, WLAN can, for example, refer to a communications network that links two or more devices using some wireless distribution method (for example, spread-spectrum or orthogonal frequency-division multiplexing radio), and usually providing a connection through an AP to the Internet;

and thus, providing users with the mobility to move around within a local coverage area and still stay connected to the network.

STA 103 can be associated with AP 102, in some examples. Similarly, AP 102 can be associated with an AC (not illustrated), in some examples. As used herein "associated with" can be coupled via various wired and/or wireless connections between devices such that data can be transferred in various directions between the devices. The association may not be a direct connection, and in some examples, can be an indirect connection.

An STA, as used herein, is a device that has the capability to use the 802.11 protocol. For example, a STA may be a laptop, a desktop personal computer, personal digital assistant, AP or Wi-Fi phone, among others. An STA may be fixed, mobile, or portable.

As used herein, an AC may generally refer to a network device offering centralized network engineering, Internet Protocol services, security and policy controls, and application-aware platforms. In addition to network control, the AC can be also deployed as branch gateways, virtual private network (VPN) concentrators, wireless intrusion prevention system (WIPS) or wireless intrusion detection system (WIDS), spectrum monitors, stateful network firewalls with integrated content filtering, etc. The AC can manage a plurality of APs and/or STAs associated with the APs in the WLAN. As used herein, an access controller refers to a management device on a computer network. For example, an access controller may manage APs within a WLAN.

AP 102 can perform management frame processing operations and perform management frame encryption and decryption operations. For instance, when a management frame is to be sent from AP 102, the management frame is generated, encrypted, and sent by the AP. Similarly, when an encrypted management frame is received at AP 102, the frame can be decrypted, and a state information of the STA can be stored. That is, as detailed herein, examples of the disclosure allow for the management frame processing operations to be performed on AP 102 and the encryption and decryption operations to be performed on the AP, rather than elsewhere such as on the AC.

For instance, management frame processing operations can include AP 102 storing state information from a management frame responsive to the AP decrypting a response management frame received from STA 103. Management frame processing operations can include, in some examples, AP 102 generating a management frame (e.g., a response/acknowledgement management frame) based on state information associated with an STA associated with AP 102 and/or storing state information of the STA. Management frame and STA state information can include, for instance, block acknowledgement state information, starting sequence numbers, terminal identification numbers, and aggregated media access control (MAC) service data unit (AMSDU) information (e.g., enabled or disabled), among others. Decryption and encryption operations, for instance, can include AP 102 storing an encryption key for encryption and decryption of management frames.

In some examples, AP 102 receives an encrypted management frame from an STA and returns an encrypted management frame in response. For instance, system 100 can include AP 102 to receive an encrypted management frame from the STA associated with AP 102, decrypt the encrypted management frame (e.g., to determine state information of the STA), and send a response management frame to the STA in response to decryption of the encrypted management frame and encryption of the response management frame by AP 102. As used herein, a response management frame includes a management frame sent in response to a request for a particular management frame. Put another way, AP 102 can receive an encrypted management frame from STA 103, decrypt the encrypted management frame, perform management frame processing, and, in some examples, the AP can generate, encrypt, and send a response management frame to STA 103, all without any encryption or decryption being performed by a AC. That is, AP 102 can store an encryption key for decryption of the encrypted management frame and/or encryption of an unencrypted response management frame.

In some examples, AP 102 sends an encrypted management frame to an STA and receives an encrypted management frame in response. For instance, system 100 can include AP 102 to generate an encrypted management frame, send the encrypted management frame to STA 103 associated with the AP, and receive an encrypted response management frame from STA 103 in response.

In some examples, an encrypted management frame and/or an encrypted response management frame can include a protected management frame. A protected management frame can be encrypted with particular encryption keys for particular functions.

Figure 2:
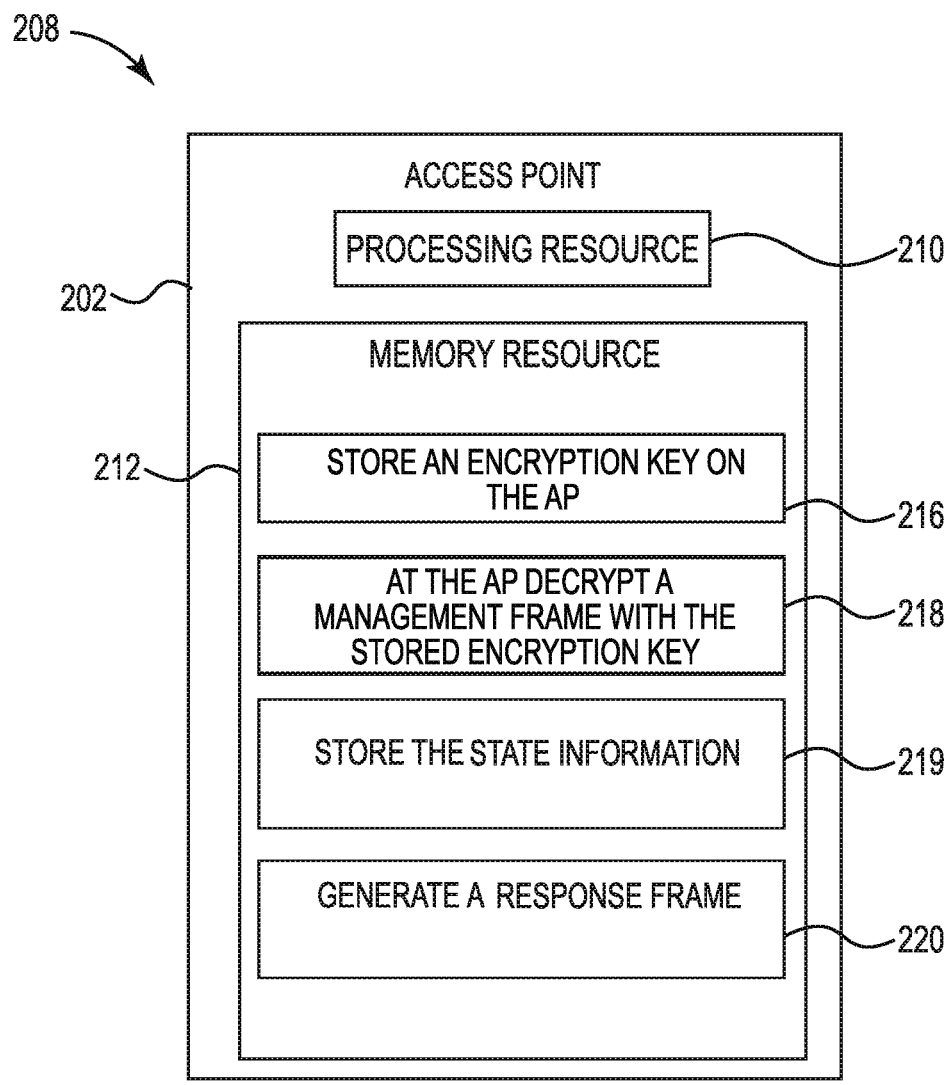
FIG. 2 is a block diagram of an example of an access point for encryption and decryption of management frames consistent with the disclosure.

FIG. 2 is a block diagram 208 of an example of an access point 202 consistent with the disclosure. As described herein, the access point 202 (e.g., access point 102, described in connection with FIG. 1) can encrypt and/or decrypt management frames. Although the following descriptions refer to an individual processing resource and an individual machine-readable storage medium, the descriptions can also apply to a system with multiple processing resources and multiple machine-readable storage mediums. In such examples, the access point 202 can be distributed across multiple machine-readable storage mediums and the access point 202 can be distributed across multiple processing resources. Put another way, the instructions executed by the access point 202 can be stored across multiple machine-readable storage mediums and executed across multiple processing resources, such as in a distributed or virtual computing environment.

As illustrated in FIG. 2, the access point 202 can comprise a processing resource 210, and a memory resource 212 storing machine-readable instructions 216 and 218 to cause the processing resource 210 to perform an operation relating to encrypting and decrypting management frames. That is, using the processing resource 210 and the memory resource 212, the access point 202 can encrypt and/or decrypt management frames at AP 202, as detailed herein.

At 219, the AP 202 can store the state information of the STA. The state information can be stored in the same location or a different location than the encryption key. For instance, the state information can be stored on AP 202 or can be stored in a different device/location than the AP 202.

At 220, the AP 202 can generate a response frame, as detailed herein. For instance, a response frame can be generated based on the stored state information and sent to a STA or sent to another device such as an access controller, among other possible devices.

Processing resource 210 can be a central processing unit (CPU), microprocessor, and/or other hardware device suitable for retrieval and execution of instructions stored in memory resource 212. Memory resource 212 can be a machine-readable storage medium can be any electronic, magnetic, optical, or other physical storage device that stores executable instructions. Thus, machine-readable storage medium can be, for example, Random Access Memory (RAM), an Electrically-Erasable Programmable Read-Only Memory (EEPROM), a storage drive, an optical disc, and the like. The executable instructions can be "installed" on the access point 202 illustrated in FIG. 2. Machine-readable storage medium can be a portable, external or remote storage medium, for example, that allows the access point 202 to download the instructions from the portable/external/remote storage medium. In this situation, the executable instructions can be part of an "installation package". As described herein, machine-readable storage medium can be encoded with executable instructions related to decryption and encryption of management frames by an AP.

The access point 202 can include instructions 216 stored in the memory resource 212 and executable by the processing resource 210 to store an encryption key on AP 202. For example, access point 202 can include instructions 216 stored in the memory resource 212 and executable by the processing resource 210 to store an encryption key in the memory resource 212 of AP 202 and/or a different storage medium (not illustrated) of AP 202.

The access point 202 can include instructions 218 stored in the memory resource 212 and executable by the processing resource 210 to at the AP, encrypt and/or decrypt a management frame with the stored encryption key (stored at 216), as detailed herein. For instance, in some examples, the access point 202 can include instructions (not illustrated) stored in the memory resource 212 and executable by the processing resource 210 to receive an encrypted management frame from a station associated with AP 202 and, responsive to receipt of the encrypted management frame, decrypt the encrypted management frame with the stored encryption key, as described herein in great detail with respect to FIG. 3. In such examples, the access point 202 can include instructions to generate a response management frame such as an encrypted response management frame with the stored encryption key and send the response management frame to the STA. However, the disclosure is not so limited. Rather, in some examples an encrypted management frame can be received from a STA, decrypted, processed for state information, and no response management frame is sent to the STA.

Similarly, the access point 202 can include instructions (not shown) stored in the memory resource 212 and executable by the processing resource 210 to generate a management frame and encrypt the management frame with the stored key. In such examples, the access point 202 can included instructions to send the encrypted management frame to a station associated with AP 202.

In some examples, the access point 202 can include instructions (not shown) stored in the memory resource 212 and executable by the processing resource 210 to maintain in AP 202 a different traffic identifier (TID) for management frames than a TID of data frames. Stated differently, AP 202 can utilize a dedicated TID for management frames that is different than a TID for data frames. Similarly, in some examples the access point 202 can include instructions maintain in AP 202 (or elsewhere) a different counter for management frames than a counter of data frames. For example, the counter can be a replay counter. Maintaining the different TID and/or the different counter (e.g., different replay counter) can avoid any potential conflict between network management/processing of data frames and management frames.

Figure 3:
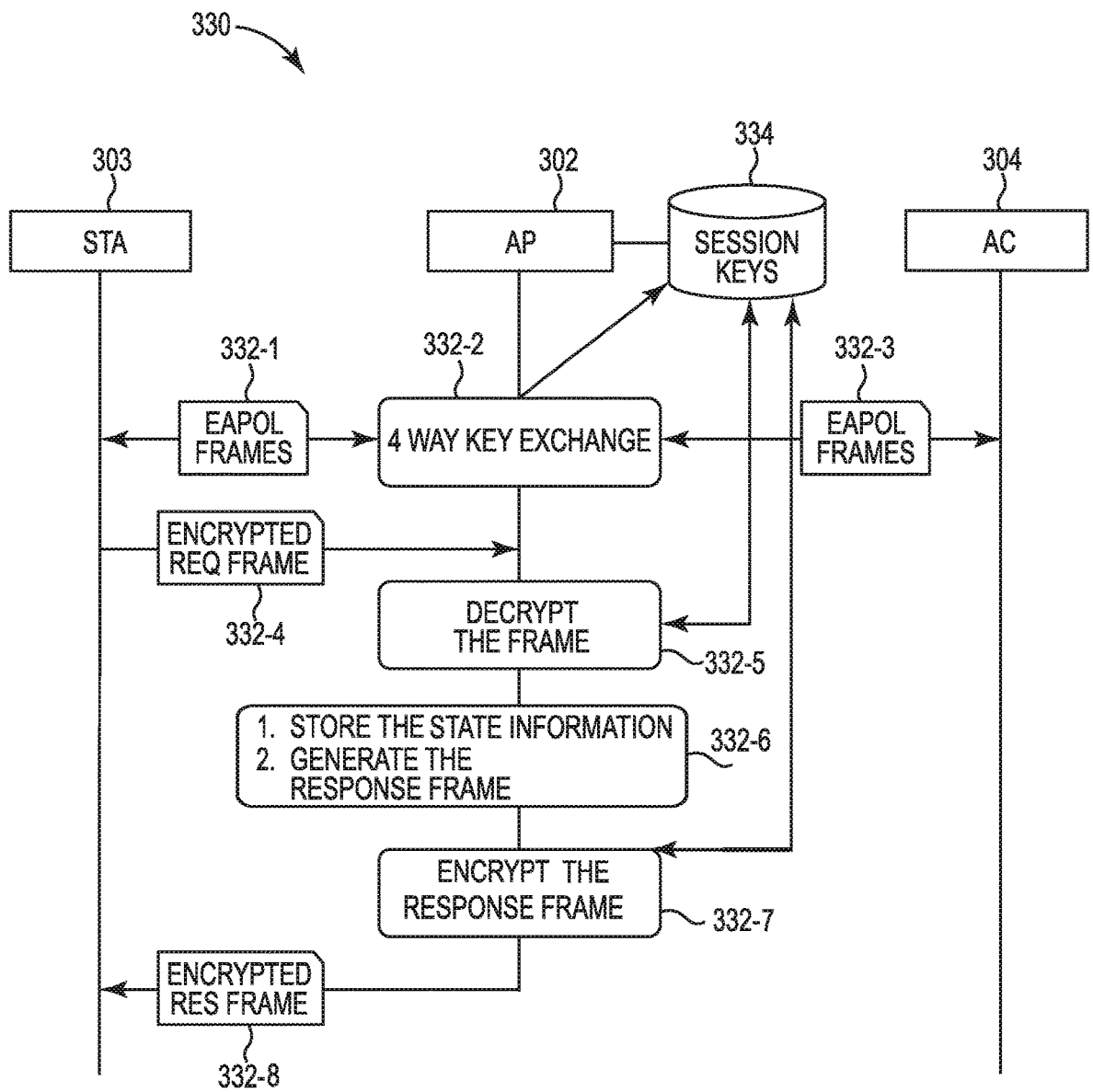
FIG. 3 is another example of a system for encryption and decryption of management frames consistent with the disclosure.

FIG. 3 is another example of a system 330 for encryption and decryption of management frames consistent with the disclosure. System 330 illustrates an example where AP 302 receives an encrypted management frame from STA 303 and returns an encrypted frame in response. In some examples, the encrypted management frame can be a protected management frame.

System 330 includes STA 303 associated with AP 302 and AC 304 associated with AP 302. An encryption key can be stored in AP 302 responsive to association of STA 303 with AP 302 and/or responsive to association of AP 302 with AC 304, among other possibilities. For instance, as illustrated at 332-1, 332-2, and 332-3 encryption keys such as four EAPOL Keys can be exchanged between AP 302 and STA 303 during a WPA/WPA2/WPA3 (or other version/protocol) in a four-way handshake employing a pre-Shared Key (PSK) or other similar secure handshake/protocol.

That is, as mentioned, an encryption key such as a PTK can be stored in AP 302. For instance, an encryption key can be stored in a memory resource 334 included in AP 302 responsive to completion of the key exchange at 332-1, 332-2, and 332-3.

At 332-4, AP 302 can receive an encrypted management frame (i.e., encrypted req frame) from STA 303. At 332-5, the encrypted management frame is decrypted at AP 302, in contrast to other approaches relying on an AC for decryption/decryption. That is, AC 304 does not perform either of encryption or decryption of management packets.

At 332-6, AP 302 processes the decrypted management frame. For instance, AP 302 can store state information of STA 303 obtained from the decrypted management frame. The state information can be stored in AP 302 or otherwise. In some examples, AP 302 can generate a response management frame. For instance, depending on a type of the decrypted management frame, AP 302 can generate a response management frame.

A generated response management frame (e.g., an acknowledgement, etc.) can be sent to STA 303. In such examples, the response management frame generated at AP 302 can be encrypted at AP 302 (e.g., with the stored encryption key), as illustrated at 332-7, and sent as an encrypted response management frame (i.e., encrypted res frame) to STA 303, as illustrated at 332-8.

Additionally, in some examples, communication between AP 302 and AC 304, including communication of unencrypted management frames and unencrypted response management frames decrypted at AP 302, can occur via a secure tunnel. However, as mentioned decrypting and encrypting management frames (in contrast to approaches that decrypt and/or encrypt management frames at an AC and then forward the decrypted management frames to the AP for processing) permit a secure tunnel between the AP and the AC but without the overhead of various security protocols such as IPsec between the AP and AC.

Figure 4:
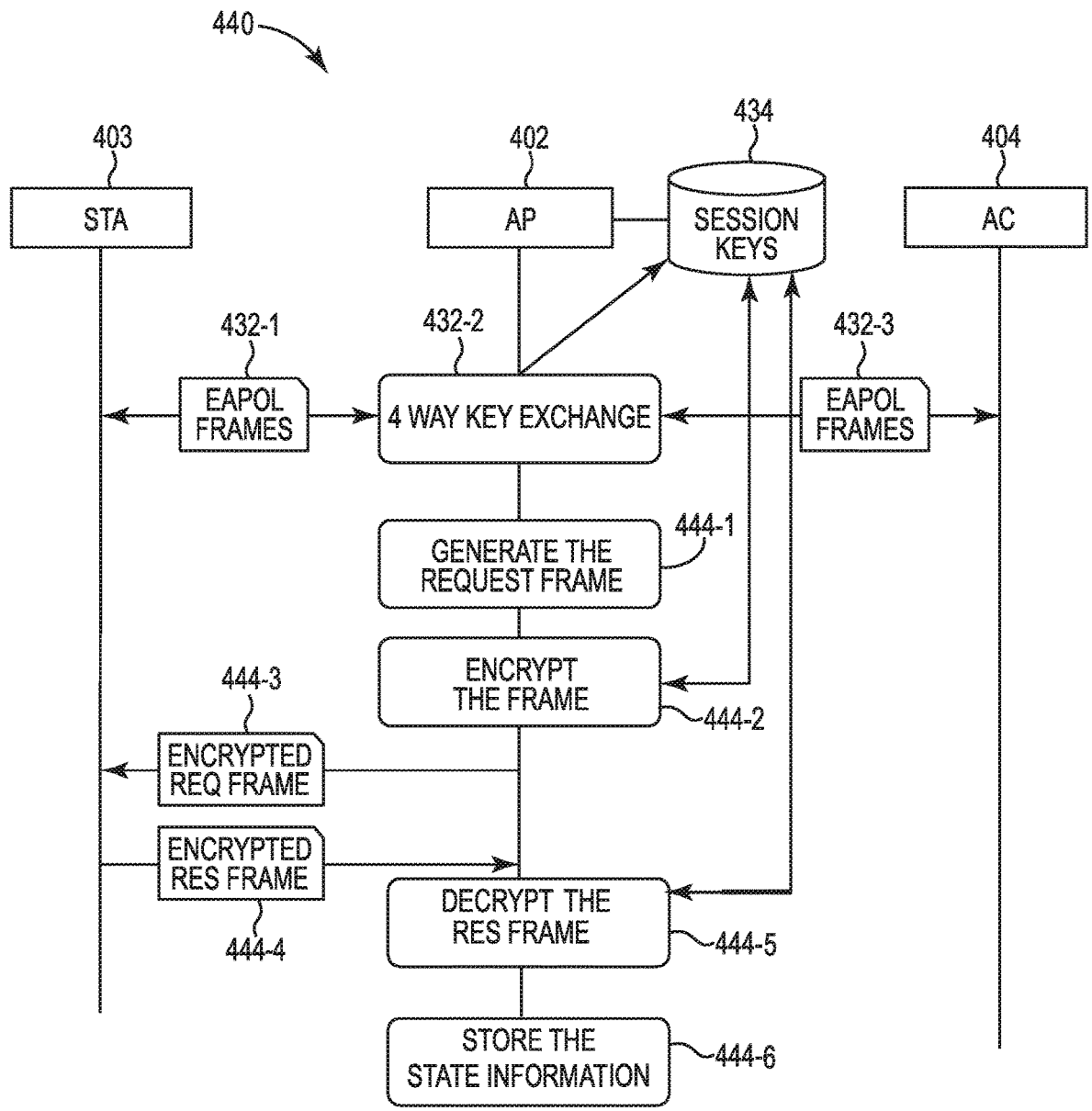
FIG. 4 is yet another example of a system for encryption and decryption of management frames consistent with the disclosure.

FIG. 4 is yet another example of a system 440 for encryption and decryption of management frames consistent with the disclosure. System 440 illustrates an example in which AP 402 sends an encrypted management frame to STA 403 and receives an encrypted management frame in response. For instance, system 440 includes STA 403 associated with AP 402 and AC 404 associated with AP 402.

Similar to FIG. 3, at 432-1, 432-2, and 432-3 system 440 can store an encryption key in a memory resource 434 included in AP 402. At 444-1 AP 402 generates a management frame that is encrypted at 444-2 and sent to STA 403 as an encrypted management frame (i.e., encrypted req frame) requesting a response from STA 403 as illustrated at 444-3. The encrypted response management frame (i.e., encrypted res frame) is sent back to AP 402 at 444-4. At 444-5, AP 402 can decrypt the encrypted response management frame sent from STA 403 to obtain state information. AP 402 can store the state information as detailed herein and illustrated at 444-6.

Figure 5:
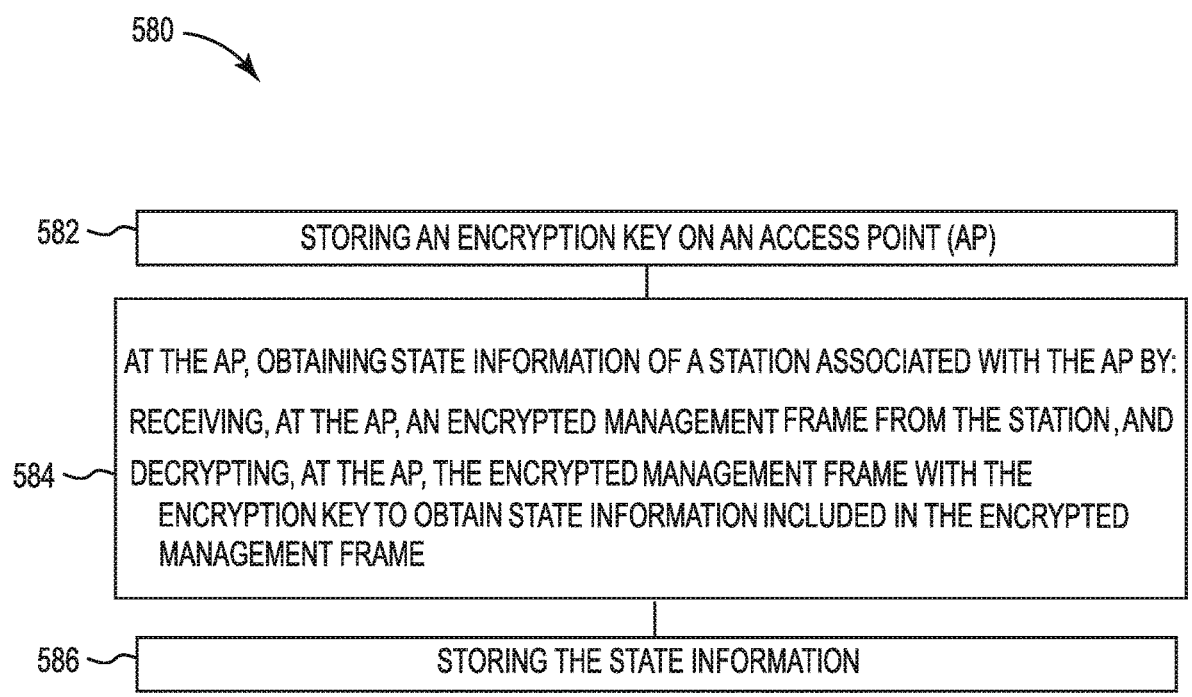
FIG. 5 illustrates an example of a method consistent with the disclosure.

FIG. 5 illustrates an example of a method 580 consistent with the disclosure. Method 580 can be performed by an access point (e.g., access points 102, 202, 302, and/or 402 described in connection with FIGS. 1, 2, 3 and 4, respectively) and/or a different device.

At 582, the method 580 can include storing an encryption key on an AP, as described herein. At 584, the method 580 can include at the AP, obtaining state information of a station associated with the AP by: receiving, at the AP, an encrypted management frame from the station, and decrypting, at the AP, the encrypted management frame with the encryption key to obtain state information included in the encrypted management frame, as described herein.

In some examples, the method can include: (i) sending an encrypted management frame from the AP to the station, receiving, at the AP, an encrypted response management frame from the station, and decrypting, at the AP, the encrypted response management frame with the encryption key to obtain state information included in the response management frame; or (ii) receiving an encrypted management frame from the station, and decrypting the encrypted management frame with the stored encryption key to obtain the state information included in the management frame, as described herein.

At 586, the method 580 can include storing the state information, as describe herein. Method 580 can be repeated. In some examples, method 580 can be repeated periodically, upon request such as request from a user/network administrator, and/or responsive to a change in a network condition. For instance, a change in a network condition can occur when new STA associates with an AP, among other possibilities.

In some examples the method 580 can include sending data frames from the station to an access controller via a secure tunnel and/or comprising sending data frames from the access controller to the station via the tunnel to maintain the data frames in an encrypted state. Stated differently, data from data frames remains encrypted end-to-end from STA to the AC, without either of decryption or encryption of the data frames at the AP. That is, the data frames remain encrypted and do not include unencrypted plain text, for example.

In the foregoing detailed description of the disclosure, reference is made to the accompanying drawings that form a part hereof, and in which is shown by way of illustration how examples of the disclosure can be practiced. These examples are described in sufficient detail to enable those of ordinary skill in the art to practice the examples of this disclosure, and it is to be understood that other examples can be utilized and that process, electrical, and/or structural changes can be made without departing from the scope of the disclosure.

The figures herein follow a numbering convention in which the first digit corresponds to the drawing figure number and the remaining digits identify an element or component in the drawing. Similar elements or components between different figures can be identified by the use of similar digits. For example, 102 can reference element "02" in FIG. 1, and a similar element can be referenced as 202 in FIG. 2. Elements shown in the various figures herein can be added, exchanged, and/or eliminated so as to provide a plurality of additional examples of the disclosure. In addition, the proportion and the relative scale of the elements provided in the figures are intended to illustrate the examples of the disclosure and should not be taken in a limiting sense. As used herein, the designator "N", particularly with respect to reference numerals in the drawings, indicates that a plurality of the particular feature so designated can be included with examples of the disclosure. The designators can represent the same or different numbers of the particular features. Further, as used herein, "a plurality of" an element and/or feature can refer to more than one of such elements and/or features.

What is claimed:

1. An access point (AP) including:
a processing resource;
a non-transitory computer-readable medium storing instructions executable by the processing resource to:
store an encryption key on the AP;
at the AP, receive, from a station (STA), a first management frame over a first firmware connection;
decrypt the first management frame with the stored encryption key to determine state information of the STA;
store the state information from the first management frame;
generate a second management frame at the AP based on the stored state information;
encrypt the second management frame with the stored encryption key;
transmit the second management frame to the STA; and
receive a first data frame over a second firmware connection, wherein the second firmware connection passes through the AP between the STA and an access controller (AC), wherein the AC does not communicate over the first firmware connection, such that communication between the AP and the AC occurs via a first secure tunnel over the first firmware connection, and communication between the STA and the AC occurs via a second secure tunnel over the second firmware connection.

2. The AP of claim 1, further comprising instructions to generate a response management frame; and
send the response management frame to the STA.

3. The AP of claim 2, wherein the response management frame is encrypted with the stored encryption key.

4. The AP of claim 1, wherein the instructions further comprise instructions to encrypt the second management frame with the stored encryption key.

5. The AP of claim 4, including instructions to send the second management frame to a second station (second STA) associated with the AP.

6. The AP of claim 1, further comprising instruction to maintain in the AP a different traffic identifier (TID) for management frames than a TID of data frames.

7. The AP of claim 1, further comprising instruction to maintain in the AP a different counter for management frames than a counter of data frames.

8. A non-transitory computer-readable medium storing instructions executable by a processing resource to:
store an encryption key on an access point (AP);
at the AP, receive, from a station (STA), a first management frame over a first firmware connection;
decrypt the first management frame with the stored encryption key to determine state information of the STA;
store the state information from the first management frame on the AP;
generate a second management frame based on the state information stored at the AP; and encrypt the second management frame with the stored encryption key;

transmit the second management frame to the STA; and receive a first data frame over a second firmware connection, wherein the second firmware connection passes through the AP between the STA and an access controller (AC), wherein the AC does not communicate over the first firmware connection, such that communication between the AP and the AC occurs via a first secure tunnel over the first firmware connection, and communication between the STA and the AC occurs via a second secure tunnel over the second firmware connection.

9. The medium of claim 8, wherein the encryption key further comprises a transient key (PTK).

10. The medium of claim 9, wherein the instructions further comprise instructions to store the PTK on the AP.

11. The medium of claim 10, wherein the instructions further comprise instructions to store the PTK on the AP responsive to the STA associating with the AP.

12. The medium of claim 8, wherein the instructions further comprise instructions to store an encryption key responsive to a four-way handshake between the AP and the STA.

13. The medium of claim 8, wherein the first encrypted management frame is a protected management frame.

14. The medium of claim 8, wherein the instruction further comprise instructions to determine the state information of the STA by:

receiving a response management frame from the STA, wherein the response management frame includes the state information of the STA.

15. A method comprising:

storing an encryption key on an access point (AP);

at the AP, obtain state information of a station (STA) associated with the AP by:

receiving, at the AP, a first management frame from the STA over a first firmware connection;

decrypting, at the AP, the first management frame with the encryption key to obtain state information of the STA included in the first management frame; and storing the state information;

at the AP, generate a second management frame based on the stored state information;

at the AP, encrypt the second management frame with the stored encryption key;

at the AP, transmit the second management frame to the STA; and receive a first data frame over a second firmware connection, wherein the second firmware connection passes through the AP between the STA and an access controller (AC), wherein the AC does not communicate over the first firmware connection, such that communication between the AP and the AC occurs via a first secure tunnel over the first firmware connection, and communication between the STA and the AC occurs via a second secure tunnel over the second firmware connection.

16. The method of claim 15, further comprising encrypting the second management frame.

17. The method of claim 15, further comprising sending data frames from the STA to the AC via a secure tunnel to maintain the data frames in an encrypted state without either of decryption or encryption of the data frames at the AP.

* * * * *